INVENTOR.
CHARLES M. WINE
BY Samuel Cohen
Attorney

Jan. 31, 1967 C. M. WINE 3,302,038

CRYOELECTRIC INDUCTIVE SWITCHES

Filed Dec. 6, 1963 4 Sheets-Sheet 2

INVENTOR.
CHARLES M. WINE
BY Samuel Cohen
Attorney

INVENTOR.
CHARLES M. WINE
BY Samuel Cohen
Attorney

Jan. 31, 1967 C. M. WINE 3,302,038

CRYOELECTRIC INDUCTIVE SWITCHES

Filed Dec. 6, 1963 4 Sheets-Sheet 4

INVENTOR.
CHARLES M. WINE
BY Samuel Cohen
Attorney

United States Patent Office 3,302,038

Patented Jan. 31, 1967

3,302,038
CRYOELECTRIC INDUCTIVE SWITCHES

Charles M. Wine, Princeton, N.J., assignor to Radio Corporation of America, a corporation of Delaware Filed Dec. 6, 1963, Ser. No. 328,707
10 Claims. (Cl. 307—88.5)

This invention relates to improved cryoelectric inductive switches. Such switches are useful in current steering networks such as switching trees.

A cryoelectric inductive switch includes a gate element formed of a superconductor such as lead and a control plane formed of a superconductor such as tin, located adjacent to the gate element. When the control plane is driven from its superconducting to its normal state, the inductance exhibited by the gate element switches from a relatively low value to a relatively high value.

In the improved switches of the present invention, the gate element is so arranged that the return path for the image current induced in the control plane by the current applied to the gate element is minimized. This causes the inductance exhibited by the gate element to be much lower in the low inductance state of the gate element (when the control plane is superconducting) than in previous inductive switch arrangements and causes a corresponding increase in the high state-low state inductance ratio exhibited by the switches.

The invention is discussed in greater detail below and is illustrated by the following drawings of which:

Figure 6A:
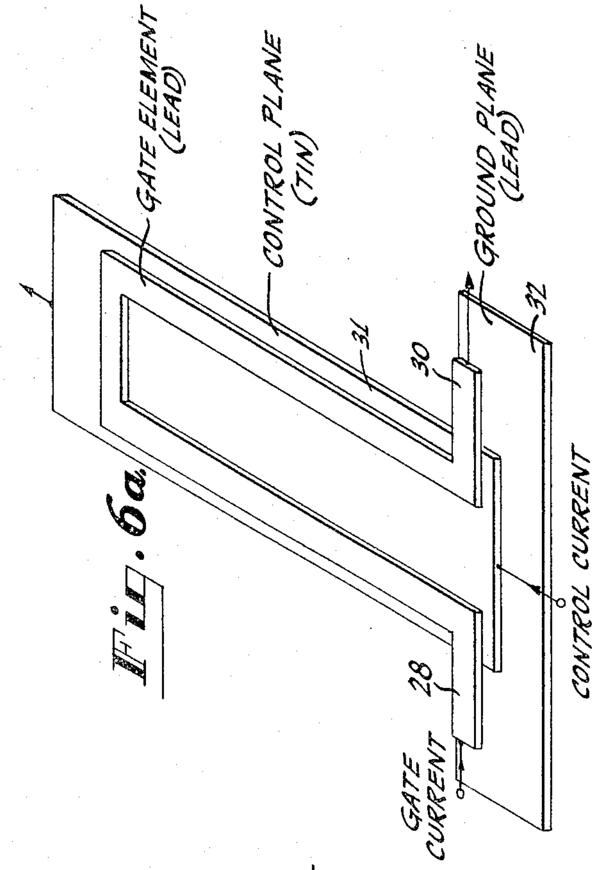
Figure 6B:
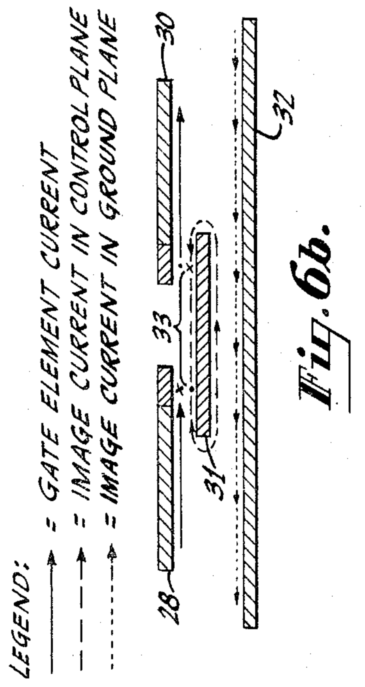
Figure 7:
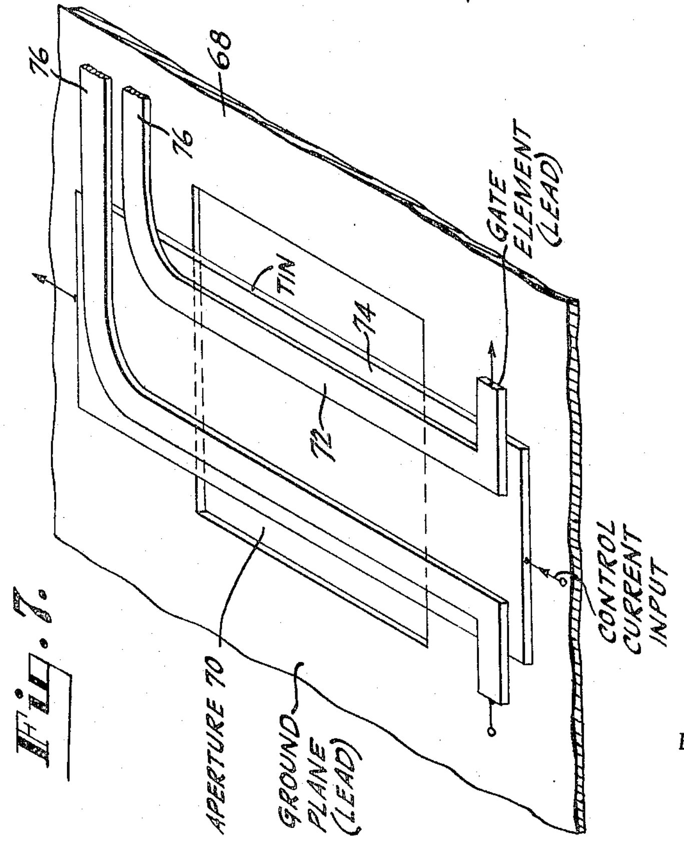
Figure 9:
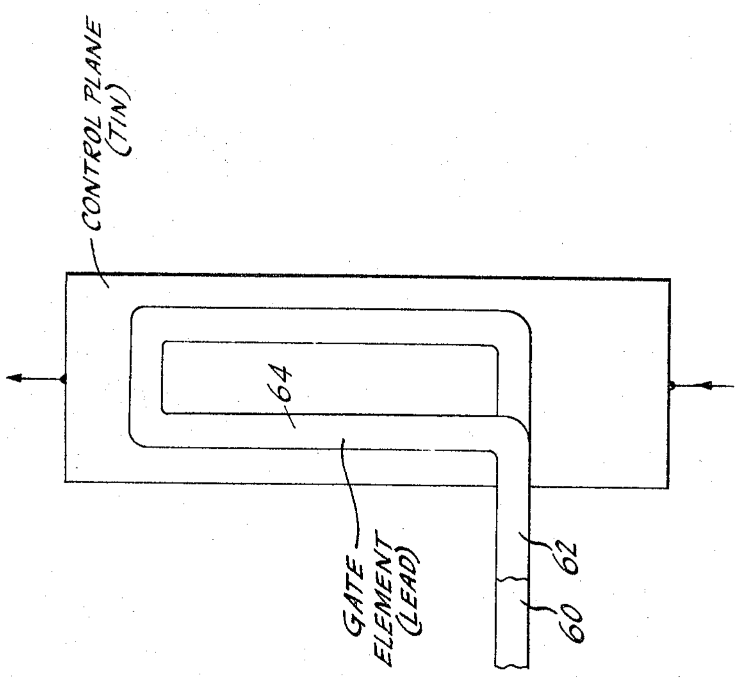
Figure 8:
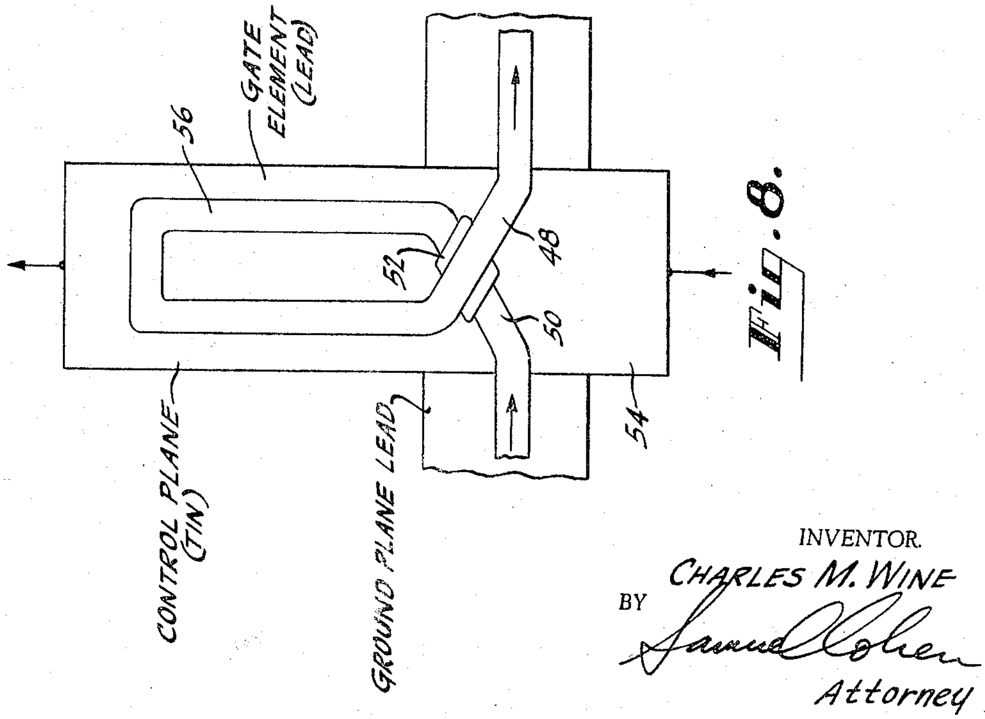

FIG. 6*a* is a perspective view of a second embodiment of an inductive switch according to the invention;

FIG. 6*b* is a cross-section through the switch of FIG. 6*a* illustrating various paths of current flow;

FIG. 7 is a perspective view of another embodiment of the invention;

FIGS. 8 and 9 are plan views of other embodiments of the present invention; and

Figure 10:
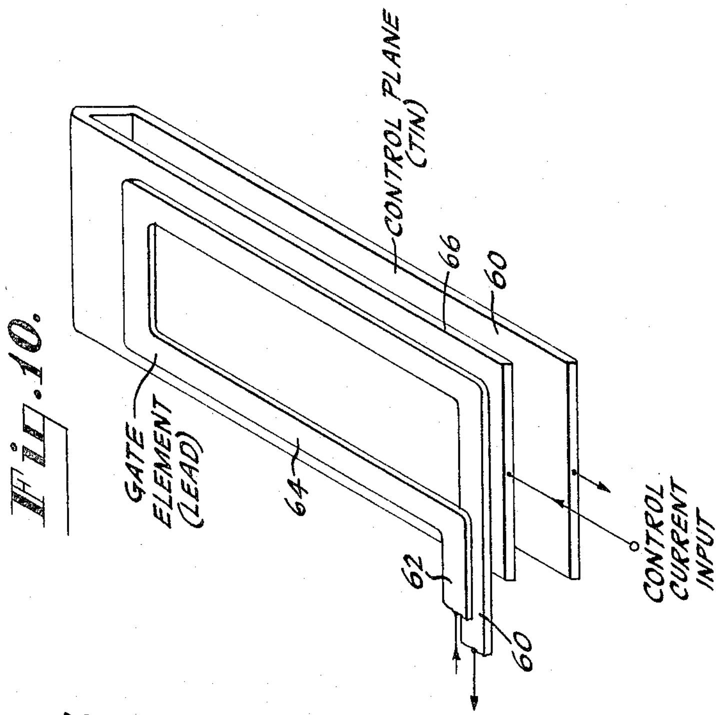

FIG. 10 is a perspective view of another embodiment of the invention.

In the discussion which follows, the devices discussed are assumed to be in a low temperature environment, such as a few degrees Kelvin, at which superconductivity is possible. Also, in the various figures the gate element and control plane are usually in the form of thin films which are vacuum deposited. These films are spaced from one another by an insulator such as silicon monoxide. For the sake of drawing simplicity, the insulator is not shown.

Figures 1, 3, 4:
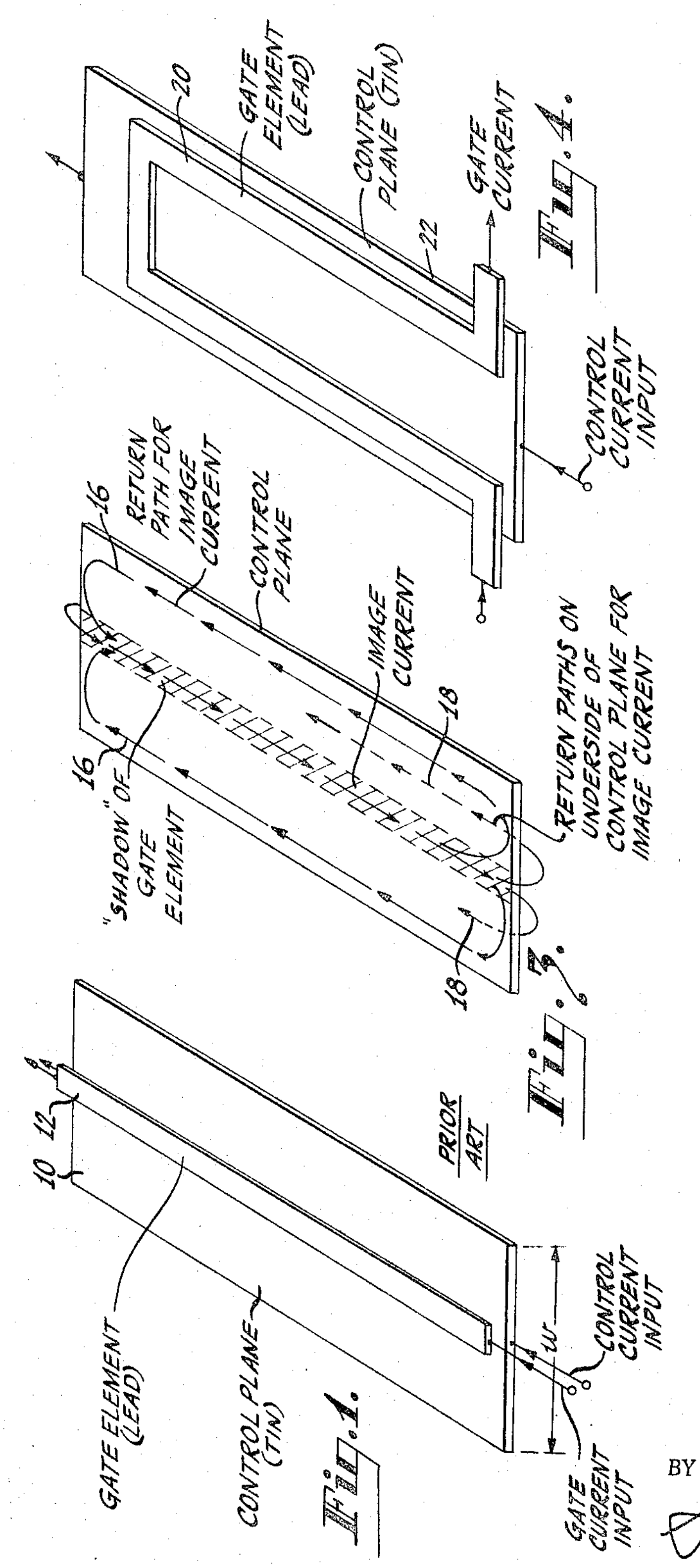
FIG. 1 is a perspective view of a prior art inductive switch.
FIG. 3 is a perspective view of the control plane of the switch of FIG. 1 in which the image current paths are shown.
FIG. 4 is a perspective view of an inductive switch according to the invention.

The known inductive switch shown in FIG. 1 includes a control plane 10 and a gate element 12 which is closely adjacent to and insulated from the control plane. The control plane is formed of a superconducting material such as tin which can be driven from its superconducting to its normal condition by a relatively low value of applied current (or magnetic field). The superconducting state-normal state transition temperature, known as the critical temperature $T_c$, is relatively low. The gate element is formed of a superconductor material such as lead which requires a substantially larger amount of input current (or magnetic field) to be driven from its superconducting to its normal state. The critical temperature for the gate material is substantially higher than that for the control plane material.

In the operation of the circuit of FIG. 1, a gate current may be applied to the gate element 12. The gate element is in its superconducting state so that zero resistance is presented to this gate current. The inductance exhibited by the gate element depends upon the state of the control plane. When the conrol plane is in its superconducting state, the magnetic field due to the current flow through the gate element is relatively confined, due to the shielding effect of a control plane, so that the inductance of the gate element is relatively low. When a control current of sufficient magnitude is applied to the control plane, the control plane is driven from its superconducting to its normal state. In its normal state, the control plane no longer acts like a shield for the magnetic field produced by the gate element and the inductance exhibited by the gate element therefore assumes a relatively high value.

Reviewing for a moment the principles of operation of the inductive switch of FIG. 1, when a current flows in a superconductor strip such as 12, an image current is induced in the adjacent superconductor plane 10 which flows in the opposite direction to the applied current. The current flow in the gate electrode is illustrated by crosses in FIG. 2 and the image current in the control plane is illustrated by dots in the same figure. Magnetic fields are produced as a result of the gate element current and its image current. It can be shown mathematically, by equations which deal with magnetic field energy, that if a magnetic field is confined to a restricted volume close to the current carrying element (the gate element in the present instance) the inductance of the current carrying element is low. If the magnetic field spreads out and occupies a larger volume of space, the inductance of the current carrying element which produces the field increases.

Figure 2:
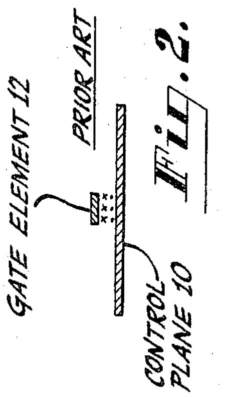
FIG. 2 is a cross-section through the switch of FIG. 1.

It is found in practicing the arrangement of FIGS. 1 and 2 that the ratio between the inductance of the switch in its high inductance state and in its low inductance state is relatively low. The high state-low state inductance ratio can be increased by increasing the area of the control plane (the minimum inductance can be shown to occur when the control plane is of infinite extent). However, this is disadvantageous as it then requires more control current to drive the control plane to its normal condition.

A theory has been developed to explain the relatively low inductance ratio above. The image current induced in the control plane in response to the gate current, flows immediately beneath the gate element, as discussed above and also as shown in FIG. 3. However, it is believed that this image current must have a return path. The return path is believed to occur both on the surface of the control plane facing the gate element, as shown at 16 in FIG. 3 and also on the underside of the control plane, as shown by the dashed arrows 18. The return paths for the image current are believed to cause magnetic fields to be generated which are not confined to the narrow region between the gate element and the control plane 10. These magnetic fields occupy a substantial volume of space and accordingly the inductance exhibited by the gate element when the control plane is in its superconducting state is substantially higher than the minimum inductance which can be assumed by the gate element.

One solution to the problem above is to employ an additional ground plane, this one a permanent ground plane, and to overlap the edges of the permanent ground plane slightly beyond the edges of the control ground plane. This is found to provide a substantial decrease in the low state inductance of the switch and a substantial improvement in the low state-to-high state inductance ratio of the inductive switch.

An improved inductive switch, according to the present invention, is shown in FIG. 4. The gate element 20 is in the shape of an elongated U and the control plane 22 is located adjacent to and is insulated from the gate element. The control plane is slightly wider than the U formed by the gate element.

Figure 5:
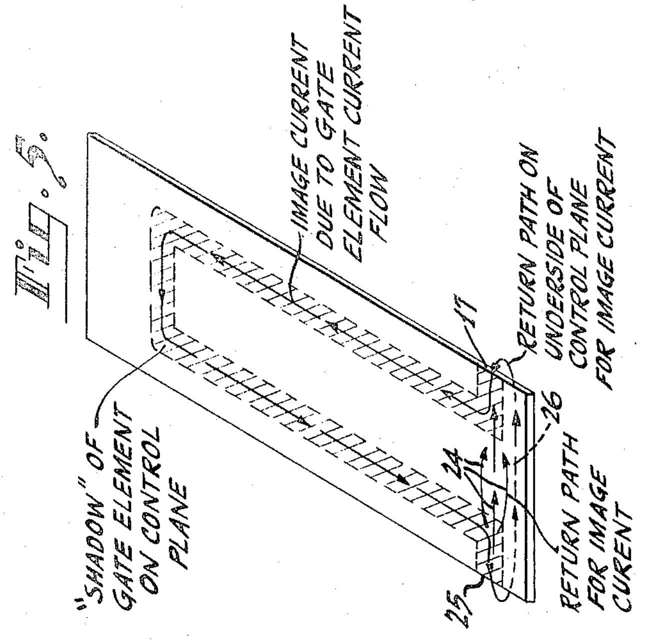
FIG. 5 is a perspective view of the control plane of the switch of FIG. 4.

The image current produced with the arrangement of FIG. 4 is shown in FIG. 5. The image current runs off the edge of the control plane at 25 and this area can be thought of as a source. The image current enters the control plane at 27 and this area can be thought of as a drain. The return path for this image current is believed to extend from the source 25 to the drain 27. Part of this path, shown by arrows 24, occurs at the upper surface of the control plane and part of this path, shown by the dashed arrows 26, occurs on the underside of the control plane. Since the return path for the image current is relatively small, the magnetic field due to this path is also relatively small. Accordingly, this magnetic field does not substantially increase the low state inductance of the inductive switch. On the other hand, the magnetic field due to the image current flow in the control plane and the gate current flow in the gate element is confined to the narrow space between the gate element and the control plane. Accordingly, the overall inductance exhibited by the inductive switch in its low inductance state is very small, much smaller than that exhibited by the prior art inductive switch of FIGS. 1–3.

With switches of the type shown in FIGS. 1–3, high state-to-low state inductance ratios of somewhat less than 2:1 have been obtained. With the overlapped permanent control plane, control current plane construction mentioned above, high state-to-low state inductance ratios of about 8:1 have been observed. With the arrangement of FIG. 4 modified as shown in FIG. 6*a*, high state-to-low state inductance ratios of about 20:1 have been observed and calculations have indicated that these 20:1 observed ratios indicate actual ratios of 40:1 or more when test set lead inductances are taken into account.

Another form of inductance switch according to the invention is shown in FIG. 6*a*. This switch is similar to the one of FIG. 4, however, a ground plane formed of a superconductor such as lead is located beneath the control plane and immediately under the input and output legs 28 and 30 of the gate element. The resulting image current flows are shown in FIG. 6*b*. The lead ground plane 32 shields the input and output legs 28 and 30 of the U shaped gate element and provides also a shield for the area beneath the control plane between legs 28 and 30. Thus, the preferred return path for image current is on the surface 31 of the control plane facing the ground plane and here the magnetic field due to this image current is shielded and confined to a small volume. The dashes 33 represent the U shaped image current path and its field is also confined, as already explained. Since all image current paths, including image current return paths, are shielded, the low state inductance of the switch is very low.

In the arrangement of FIG. 8, the two legs of the U 48 and 50 cross over one another. The legs are insulated from one another where they cross by a suitable electrical insulator, such as silicon monoxide insulation 52. The image current flow in the control plane 54 occurs largely in the surface of the control plane facing the gate element 56.

In the arrangement of FIG. 9, the input and output leads 60 and 62 of the gate element 64 lie under one another and are parallel to one another. These leads 60 and 62 are also insulated from one another by a layer of insulator material such as silicon monoxide. The two legs, so arranged, form a transmission line with relatively low inductance and relative freedom from "end effects" without the use of a permanent ground plane. The expression "end effects" refers to the increase in low state inductance discussed above due to the magnetic field produced by the image currents in the return paths.

The arrangement of FIG. 10 is similar to the one of FIG. 9 except that the control plane 66 is folded back upon itself to reduce the control plane inductance. This arrangement provides a somewhat better low state-high state inductance ratio for the switch than the single control plane versions already discussed. While the gate element is shown above the control plane it can be between the two sections of the control plane instead.

In the arrangement of FIG. 7, the permanent ground plane 68 is quite large and is formed with an aperture 70. The gate element 72, which is located adjacent to the control plane 74, passes over the aperture. The end of the gate element may be led off the control plane at both ends. At the far end, this is illustrated by the break-away view at 76.

The operation of the arrangement of FIG. 7 is similar to that of the inductive switches already discussed. When the control plane 74 is in its superconductive state, the image current due to the gate current is confined to the area beneath the gate element. The return path for the image current is substantially entirely on the shielded undersurface of the control plane, as discussed in connection with the embodiment of FIG. 6, and this permits very little dispersion of the magnetic field. Accordingly, the inductance exhibited by the switch is relatively low. When the control plane is driven to the normal state, the magnetic field due to the gate current passes through the aperture 70 and the inductance exhibited by the gate element increases substantially.

In the various arrangements discussed above, the inductance of the U shaped gate element in its high state may be substantially increased by placing a material having relatively high permeability, such as a ferromagnetic material, on the side of the control plane opposite from the gate element. Also, although explained in terms of operation in the normal (resistive) or superconductive states, the control plane may instead be driven between the intermediate and superconductive states. In general, to produce a change in inductance in the gate element it is necessary substantially to change the penetration depth $\lambda$ of the control plane. This may be done by driving the control plane to its intermediate or normal state and may even be made to occur in the superconductive state of the control plane. Further, while in the forms of the invention illustrated, a current is employed to drive the control plane normal, other means may be used instead. For example, a magnetic field may be applied to the control plane as discussed in a paper "The Inductance Switch, a Cryogenic Logic Element," by Meyerhoff et al., presented at the Cryogenics Engineering Conference, Boulder, Colorado, on August 20, 1963, and published in the proceedings of that conference. Or, other forms of energy such as radiant energy, heat, microwaves or the like may be directed at the control plane to switch it from the superconducting to the intermediate or normal state.

The inductive switches of the invention are shown to have lead gate elements and tin control planes. These materials are merely illustrative. In general, the gate element is formed of a material having a relatively high critical temperature $T_c$ and the control plane is formed of a material having a relatively low critical temperature. In other words, the gate element is more difficult to switch to the normal state than the control element and, in operation, the gate element always remains in the superconductive state. Alternatively, it is possible to operate the switch in the manner discussed in copending application Serial No. 321,580, filed November 5, 1963, by the present inventor in which event both the control plane and gate element are both formed of a superconductor such as tin.

What is claimed is:

1. An inductive switch comprising:

a superconductive control plane;

a current carrying superconductive gate element located close to the control plane having relatively closely spaced input leads over said control plane and a relatively long current carrying path over said control plane connected to said input leads;

and means other than said gate element for substantially increasing the penetration depth λ of the control plane to effect a change in inductance of said gate element.

2. An inductive switch as set forth in claim 1, wherein said last-named means comprises means for applying a current to said control plane of sufficient magnitude to drive the control plane to its resistive state.

3. An inductive switch comprising:

a superconductive control plane;

a current carrying superconductive gate element located close to the control plane having two spaced legs over the control plane which are joined at one end and which are relatively close to one another, compared to a length of said gate element, at the other end thereof so that the image current the gate element induces in the control plane has a relatively short return path compared to the path of the image current;

and means other than the gate element for switching the control plane between superconducting and non-superconducting states to effect a change in inductance of said gate element.

4. An inductive switch comprising:

a superconductive control plane;

a current carrying superconductive gate element located close to the control plane having relatively closely spaced input leads over said control plane and a relatively long current carrying path over said control plane connected to said input leads, whereby the image current the gate element induces in the control plane has a relatively short return path compared to the path of the image current;

and means other than said gate element for applying a current to the control plane for switching it between superconducting and normal states to effect a change in inductance of said gate element.

5. An inductive switch comprising:

a superconductive control plane formed of a material having a relatively low critical temperature;

a current carrying superconductive gate element formed of a material having a relatively high critical temperature lying in a plane parallel to the control plane and insulated therefrom, said gate element having two legs over the control plane and joined at one end, and an input lead to one leg and an output lead from the other leg at the other end of the two legs, the input and output leads being spaced relatively close to one another where they join the two legs over the control plane so that the return path in the control plane for the image current induced in the control plane is relatively short; and means other than said gate element for driving the control plane between superconducting and non-superconducting states for changing the inductance of said gate element.

6. An inductive switch comprising:

a superconductive control plane;

a superconductive gate element lying in a plane parallel to the control plane and insulated therefrom, said gate element having two legs lying over the control plane which are joined at one end, and are relatively close to one another and over the control plane at the other end;

means coupled to said other end of said gate element for supplying an input signal current thereto; and means other than said gate element for driving the control plane between superconducting and non-superconducting states to effect a change in inductance of said gate element.

7. An inductive switch comprising, a laminated thin film structure including:

a thin film superconductive control plane;

a thin film superconductive gate element lying in a plane parallel to the control plane and insulated therefrom, said gate element having two legs over the control plane which cross over one another but are not connected at one end and which are joined at the opposite end, both of said ends lying over said control plane;

means coupled to said gate element at said one end for applying a signal current thereto; and means other than said gate element for driving the control plane between superconducting and non-superconducting states for changing the inductance of said gate element.

8. An inductive switch comprising, a laminated thin film structure including:

a thin film superconductive control plane;

a thin film superconductive gate element lying in a plane parallel to the control plane and insulated therefrom, said gate element having two legs over the control plane which at one end, also over the control plane, are closely spaced, lie over one another, are parallel, and are insulated from one another and which are joined to one another at their opposite end;

means coupled to said gate element at said one end for applying a current thereto; and means other than said gate element for driving the control plane between superconducting and non-superconducting states for changing the inductance of said gate element.

9. An inductive switch comprising, a laminated thin film structure including:

a thin film superconductive control plane which is folded back upon itself so that one part of the control plane lies in one plane and the second part of the control plane lies in another plane;

a thin film inductive gate element lying in a plane parallel to the folded back control plane and insulated therefrom, said gate element having two legs over the control plane which are closely spaced but are insulated from one another at one end and which are joined at the opposite end;

means coupled to said gate element at said one end for applying a current thereto; and means other than said gate element for driving the control plane between superconducting and non-superconducting states.

10. An inductive switch comprising, a laminated thin film structure including:

a ground plane formed with an aperture therein;

a thin film superconductive control plane lying over said aperture and arranged in a plane parallel to the ground plane;

a thin film superconductive gate element lying in a plane parallel to the control plane, said gate element having relatively closely spaced input leads over said control plane and a relatively long path over said control plane connected to said input leads;

means coupled to said gate element at said input leads for applying a signal current thereto; and means other than said gate element for driving the control plane between superconducting and non-superconducting states to effect a change in inductance of said gate element.

References Cited by the Examiner

UNITED STATES PATENTS

| | | | |
|---|---|---|---|
| 2,944,211 | 7/1960 | Richards | 323—94 |
| 2,952,792 | 9/1960 | Yhap | 313—108 |
| 3,015,041 | 12/1961 | Young | 307—88.5 |

(Other references on following page)

UNITED STATES PATENTS

| | | | |
|---|---|---|---|
| 3,059,196 | 10/1962 | Lentz | 338—32 |
| 3,145,310 | 8/1964 | Bertuch et al. | 307—88.5 |
| 3,191,160 | 6/1965 | Alphonse | 340—173.1 |
| 3,209,172 | 9/1965 | Young | 307—88.5 |
| 3,215,967 | 11/1965 | Burns et al. | 338—32 |
| 3,245,020 | 4/1966 | Lentz | 338—32 |

OTHER REFERENCES

IBM Tech. Disclosure Bulletin "Disc Type Cryotron," vol. 3, No. 7, December 1960, page 41 relied on.

JOHN W. HUCKERT, *Primary Examiner.*

R. F. SANDLER, *Assistant Examiner.*